(12) United States Patent
Mark et al.

(10) Patent No.: US 6,687,358 B1
(45) Date of Patent: Feb. 3, 2004

(54) METHOD AND APPARATUS FOR JOINING A PARTY TO A MULTIPOINT CONFERENCE USING DIGITAL TECHNIQUES

(75) Inventors: Jeffrey Mark, Santa Barbara, CA (US); Kalon Kelley, Santa Barbara, CA (US); Mark Grosen, Goleta, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/527,947

(22) Filed: Mar. 8, 2000

Related U.S. Application Data

(60) Provisional application No. 60/186,143, filed on Mar. 4, 2000.

(51) Int. Cl.$^7$ ................................................ H04M 3/42
(52) U.S. Cl. ............................ 379/202.01; 379/93.21; 379/204.01; 379/205.01
(58) Field of Search ........................ 379/93.21, 202.01, 379/204.01, 205.01, 93.23, 100.06, 158; 370/260, 261, 262; 709/204

(56) References Cited

U.S. PATENT DOCUMENTS

| | | | | |
|---|---|---|---|---|
| 5,369,694 A | * | 11/1994 | Bales et al. ............ | 379/206.01 |
| 5,483,588 A | * | 1/1996 | Eaton et al. ........... | 379/202.01 |
| 5,973,724 A | * | 10/1999 | Riddle ..................... | 348/14.07 |
| 6,175,619 B1 | * | 1/2001 | DeSimone ............. | 379/202.01 |
| 6,272,214 B1 | * | 8/2001 | Jonsson ................. | 379/202.01 |
| 6,304,648 B1 | * | 10/2001 | Chang ................... | 379/202.01 |
| 6,418,214 B1 | * | 7/2002 | Smythe et al. ......... | 379/202.01 |

* cited by examiner

Primary Examiner—Bing Bui
(74) Attorney, Agent, or Firm—Blakely, Sokoloff, Taylor & Zafman LLP

(57) ABSTRACT

An improved technique of managing a multiparty conference of a digital domain such as the Internet is disclosed. As parties are added to the conference, the original conference member adding such parties is kept apprised of the status of the addition. Moreover, a joining member attempts to establish communications with all of the present conference members identified in an original invite message from one of the conference members. If some of the conference members subsequently drop out of the conference, overhead is minimized by allowing each of those dropped-out conference members to advise the joining member of the same.

15 Claims, 1 Drawing Sheet

METHOD AND APPARATUS FOR JOINING A PARTY TO A MULTIPOINT CONFERENCE USING DIGITAL TECHNIQUES

RELATED APPLICATION

This application claim priority to provisional application No. 60/186,943 filed Mar. 4, 2000.

TECHNICAL FIELD

This invention relates to multiparty conferences, and more particularly, to multiparty audio, video, or other types of conferences implemented over a data network using digital techniques.

BACKGROUND OF THE INVENTION

Call conferencing is an old technology utilized to facilitate communications among a plurality of conference members. Such technology is conventionally utilized for audio communications over standard telephones. More recently, conferencing technology has also been utilized for video signals. A conventional conferencing system operates by patching together multiple parties via a conference bridge. A conference bridge operates by transmitting to each conference member a signal that represents the sum of all of the other conference members' inputs. Thus, each member hears all the audio generated by the other members.

Conventional analog conferencing systems do not provide flexibility and ease of use for conference members. Specifically, there is no easy way for controlling which conference members receive any one or more particular signals. Rather, each conference member receives the sum of signals produced by all other conference members.

Another problem with conferences based upon conventional telephony is that the bandwidth utilized to transmit audio over a conventional telephony system includes a large amount of waste. This is because a circuit connection exists from each conference member to all other conference members. Much of the bandwidth of the circuit connection is idle a large amount of time.

The modern trend is to convey more and more audio and video traffic over data networks such as the Internet. This trend is applicable to conferencing systems as well. Use of the Internet maximizes the efficiency of the network because packets related to multiple different communications sessions can be conveyed over the same physical media. Thus, Internet based audio/video conferencing systems have emerged recently.

The use of digital techniques to implement conference calls allows a variety enhanced services to be implemented, and eliminates waste of bandwidth. Moreover, the conference bridge itself may be eliminated since conferencing is implemented by forwarding separate copies of a packet from an originating entity to multiple receiving entities. At the same time, digital conferencing techniques present their own problems. Digital conferences cannot be implemented by simply summing all of the inputs to create a signal for each particular conference member. Rather, the packets of data must be assembled, ordered properly and then conveyed appropriately. Additionally, the use of digital techniques provides that conferences may be divided into multiple conferences and reassembled, merged with other conferences, etc. All of this must be managed.

A document dated Jun. 17, 1999, generated by the Internet Engineering Task Force describes basic techniques of arranging conferences over the Internet using digital techniques. The described technique solves some of the foregoing problems. The technique described therein is lacking in several aspects. In arranging for a conference, it uses a flooding technique wherein each member of the conference advises a member seeking to join the conference if members previously in the conference drop out. This flooding technique results in added overhead. Additionally, if a member attempting to join the conference is locked out by a present member of the conference, there is no easy technique for overriding such lockout. There are a variety of other cumbersome techniques used in the referenced system.

There exists no known technique for efficiently monitoring and managing conferences as they are set up, merged, split, and destroyed. There exists no known technique of efficiently adding members to an Internet based audio or video conference. Accordingly, there exists a need in the art for an improved technique of managing distributed multipoint conferences using the Internet and/or other similar data networks.

SUMMARY OF THE INVENTION

The above and other problems of the prior art are overcome in accordance with the present invention which relates to a technique of monitoring and controlling various aspects of conferences. In accordance with the present invention, a conference is set up by an "inviting" member inviting others to join the conference. The invitation specifies which, if any, other members are presently in the conference and thus, the "joining" member knows with which other conference members to communicate. Importantly, if the invitation contains the identification of members that later drop out of the conference, those members are nonetheless contacted by the joining member as if they were in the conference. Those other members that have previously dropped out would then advise the joining member that they are no longer in the conference. The use of the original information in the invitation to specify conference members, rather than having the conference membership information updated each time the joining member contacts one of the specified conference members and that specified member indicates that some other member has dropped out of the conference, eliminates additional management and processing overhead when compared with prior systems.

In another embodiment, a joining member may be denied permission to join by any of the conference members. The particular member denying such admission may have its identity broadcast to the other members by the member attempting to join the conference. Other members may agree or disagree with the decision, and determine whether or not to override such decision to reject the joining member. Alternatively, the remaining conference members, if they want the joining member to join, may cut off the member rejecting the joining party from the conference.

In another embodiment, after a joining member is invited to join the conference by the inviting member, the joining member seeks and receives permission from each of the other conference members. As each conference member responds by granting or denying permission, the inviting party is kept apprised of the status.

The above and other objects of the invention will become clearer with reference to the following description of the preferred embodiment and the accompanying drawings.

DETAILED DESCRIPTION OF THE PREFERRED EMBODIMENT

Figure 1:
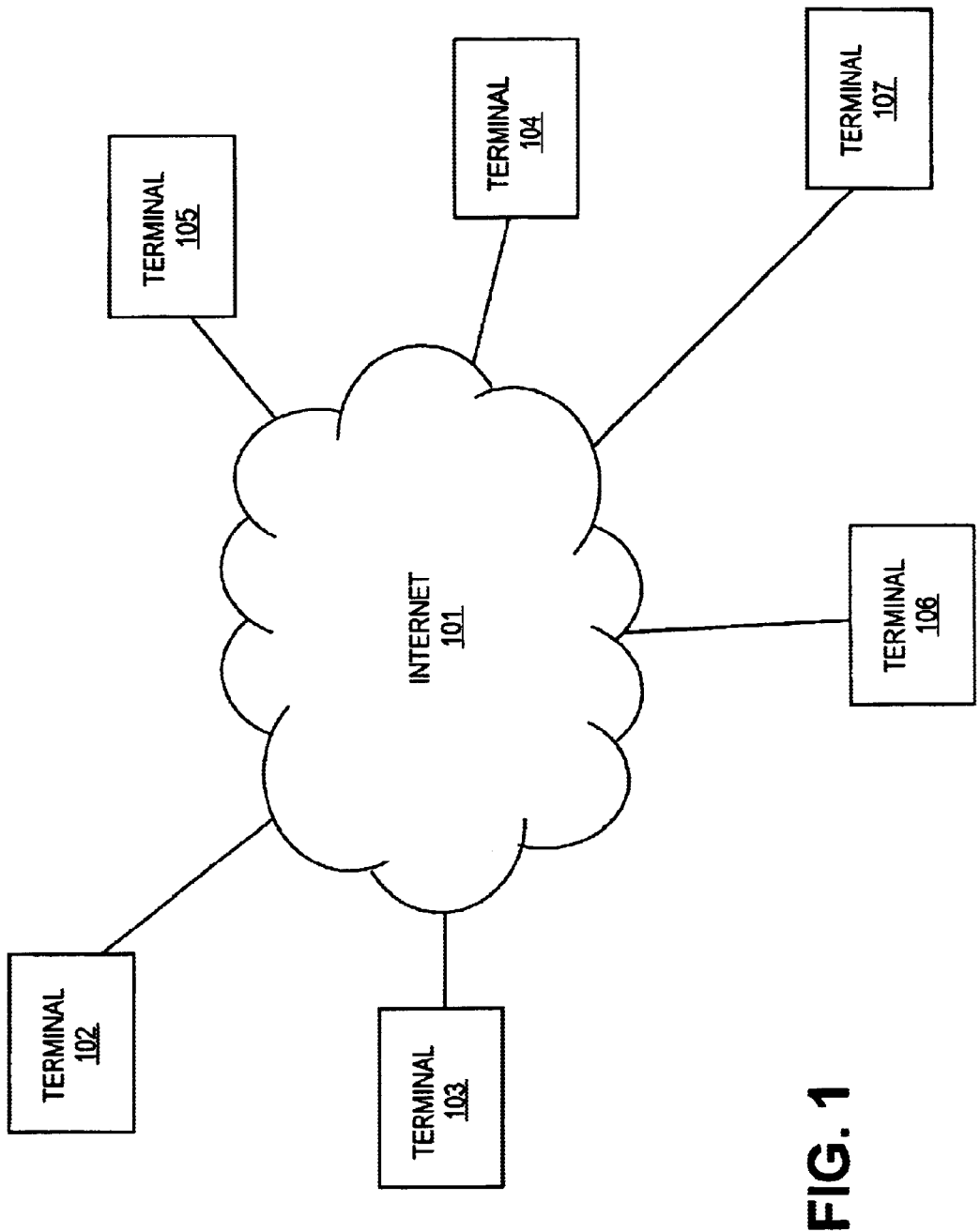
FIG. 1 is a high level conceptual diagram of a plurality of terminals in communication with each other over the Internet.

FIG. 1 shows a high level conceptual diagram of a portion of the Internet 101 connected to six exemplary terminals 102–107. The particular type of hardware and software resident at the terminals 102–107 may vary greatly and is not critical to the present invention. The only requirement for such terminals 102–107 is that they be capable of audio and/or video communications in the conference, and that they implement the appropriate protocols as further described below. It is also noted that while use of the Internet is the preferred embodiment, other networks are possible.

For purposes of explanation, we presume that a conference is ongoing among members 102, 103 and 104. During such conference, it is desired to add member 105 to the conference. Conference member 104 decides to initiate the addition of joining member 105 to the conference. Conference member 104 is denoted herein the inviting member.

Unlike conventional telephony conferences described with respect to the prior art, conferences implemented over the packet switching Internet need not include a conferencing bridge for summing all of the signals from the conference members. Instead, each member of the conference simply sends the packets to all other conference members, and multiple copies of the packets from any conference member are transmitted with different destination addresses. Alternatively, a multicast system may be used, wherein a single packet is sent but recognized as destined for multiple recipients.

An inviting member of the present conference 104 decides to invite joining member 105 to join the conference. An invite message is sent from member 104 to joining member 105 which indicates that members 102 and 103 are also participants in the conference. Member 105 then sends "triggered invites" to conference members 102 and 103, indicating that conference member 104 has requested that joining member 105 join the conference. Members 102 and 103 may then grant or deny permission via a consent/denial message. Conference member 104 has indicated its consent via issuance of the invite message.

In establishing a signal relationship between member 105 and members 102 and 103, situations may arise wherein members 102 and 103 are no longer part of the conference. Specifically, members 102 and/or 103 may have dropped out of the conference after the time that member 104 sent the invite message to joining member 105, but prior to joining member 105 joining the conference. Hence, the invite message would include the IDs of conference members that, by the time contacted by the joining member, are no longer members of the conference.

Importantly, the techniques of the present invention do not provide for any of the members 102 or 103 to provide information to joining member 105 indicative of whether the membership in the conference with respect to other members has changed at all. Instead, joining member 105 contacts all of the conference members specified in the original invite message from inviting member 104. If any of those specified members have dropped out of the conference, they simply advise joining member 105 that they are no longer a party to that conference. If however, when conference member 102 is contacted, conference member 102 is already aware that member 103 has dropped out of the conference, that information is not conveyed from conference member 102 to conference member 104. Instead, member 103 would advise joining member 104 of member 103's own status when member 104 attempts to establish communications with conference member 103. This technique minimizes processing at joining member 105.

If new members join during the joining process, it is possible that a conference member 103 may reflect new conference members not specified in the original invite message. Should this occur, the information would be conveyed to the joining member. In general, if a joining member contacts a current conference member, that conference member has record of the present membership in the conference. The contacted conference member may show additional members that are not shown in the original invite message. Information regarding such additional members would be sent to the joining member, so that the joining member may also contact these additional members. On the other hand, the contacted member may have information indicating that members specified in the invite message have since dropped out of the conference. That additional information is not sent to the joining member. Instead, the joining member is left to contact those members which have since dropped out of the conference, and the joining member will be advised of the status by the member that have dropped out of the conference.

In most cases, the conference members specified in the original invite message will, in fact be the same conference members contacted by joining member 105. However, to the extent that the state of membership of the conference is different from that specified, less overhead is incurred by simply allowing the joining member to contact all specified members from the invite message, even if some of those contacts are unnecessary because the members being contacted have dropped out of the conference. This arrangement results in less overhead than advising the joining member each time it contacts a present conference member regarding which other members have since dropped out. If a member that has dropped out of the conference and is contacted by a joining member, the member that has dropped out of the conference would simply send back a message indicating that it is no longer a party to such conference.

With respect to members that remain parties to the conference, those members would reply to a request from member 105 to join the conference. The reply could consist of an admission to the conference or a denial. Once joining member 105 receives admissions to the conference from all conference members specified in the original invite message, as well as those that joined after the invite message was sent, saving those that have since dropped out of the conference, member 105 is considered a conference member.

A joining member 105 may be rejected by any of the conference members. The technique of the present invention provides that if a conference member rejects a joining member, a message is sent to at least the inviting member which indicates the particular member rejecting such joining member. Thus, if conference member 102 denied joining member 105 permission to join the conference, then a message would be sent from joining member 105 to conference member 104 indicating that contrary to the request of inviting member 104, joining member 105 may not join the conference because he has been denied access by conference member 102. This feedback to the inviting member permits the inviting member to seek additional explanation from the rejecting member 102 (even within the media stream of the conference itself), as to why such access is being denied. Additionally, inviting member 104 may have the option to disconnect member 102 from the conference, to thereby facilitate removal of the party denying access to joining member 105.

Moreover, other conference members may be advised of the identity of the rejecting member as well. Such other conference members may be given a similar or subset of the rights inviting member 104 has to deal with and/or override the situation of a conference member rejecting a joining member.

An alternative method of overriding the denial to a joining member involves bridging into the conference through a single overriding member. Specifically, a conference member may facilitate the joining member's entry to the conference by forwarding all communications to and from the conference to the joining member. Thus, if conference member 103 wishes to merge a joining member into the conference over the objection of other conference members, member 103 may do so by forwarding all conference communications to the joining member, and transmitting all communications from the joining member to the remainder of the conference members. Member 103 would have to have the appropriate clearance (e.g., password) to override the rejections given by one or more other members. Thus, through the use of passwords, certain members may be designated with override privileges.

During the joining process, the joining member 105 receives responses from each of the conference members, other than the inviting member, 104. As these responses are received, the joining member 105 is admitted by various members of the conference. During the admissions process, an improved embodiment contemplates that the inviting member would be periodically apprised of the status of the admission. Specifically, the inviting member may be apprised of each present conference member that admits the joining member 105 as that admission is sent from the conference member to the joining member. Alternatively, during the admissions process, until the joining member is fully admitted, periodic messages may be sent to inviting member 104 to advise the inviting member which members have admitted joining member 105. These status messages would ideally be sent from joining member 105 to the inviting member, wherein the last status message is a message indicating that full admission has been received from all members and the joining member has now joined.

Once joined, all future packets from other conference members are sent to member 105. Additionally, any future invite messages would include member 105, and member 105 can itself invite others to join the conference.

While the above describes the preferred embodiment of the invention, various modifications or additions will be apparent to those of skill in the art. Such modifications are intended to be covered by the claims pending hereto.

What is claimed is:

1. A method of connecting a joining member to a conference implemented over a digital network, the conference including a plurality of conference members, the method comprising:
    transmitting an invitation from a conference member to said joining member, the conference member transmitting the invitation being denoted the inviting member, the invitation including information indicative of other conference members,
    initiating a contact from said joining member to said conference members indicated in said invitation, regardless of whether such indicated members have since dropped out of the conference,
    receiving a signal indicative of admission of said joining member to join said conference from all other conference members,
    wherein said step of receiving includes receiving a signal indicating that admission to the conference has been denied; and
    wherein an indicator of the identity of one or more specific conference members denying admission to said conference to said joining member is transmitted to other conference members.

2. The method of claim 1 wherein said signal indicative of admission being denied is sent to other conference members.

3. The method of claim 1 wherein one or more conference members denying admission to said joining member are subsequently removed from the conference.

4. The method of claim 1 further comprising receiving at said joining party a signal indicative of one or more conference members that have since left the conference and which are nonetheless specified in the invite message.

5. The method of claim 1 wherein said contact is initiated to all conference members.

6. The method of claim 1 wherein status messages regarding the present status of a joining member with respect to its joining the conference are transmitted back to the inviting member.

7. The method of claim 1 wherein said step of receiving also includes receiving a signal indicative of other joining members attempting to join the conference.

8. The method of claim 1, further comprising transmitting status messages to said inviting member from said joining member as said joining member establishes communications with said other conference members.

9. The method of claim 1, further comprising sending a message to said inviting member from said joining member to indicate status each time communications with another conference member is established.

10. Digital conferencing apparatus for joining a conference taking place over a packet data network, said apparatus comprising:
    software for receiving an invite message from an inviting member, said inviting member already being a participant in the conference, said invite message specifying a set of members of said conference;
    means for sending triggered invites to each of said members specified in said invite message;
    means for receiving messages from each of said members indicating whether admission to the conference is approved, and for advising said inviting member if approval to join said conference is withheld, and
    wherein said receiving and advising means also advises the inviting member of the identity of any conference member withholding said approval to join said conference.

11. Apparatus of claim 10 further comprising a second apparatus for transmitting a message from the inviting member to the conference member withholding said approval to join said conference, said message requesting an explanation concerning the reason approval as being withheld.

12. The apparatus of claim 10, further comprising means for sending a response to said joining party, said response being indicative of whether said joining party is to be granted permission to join the conference, denied permission to join the conference, or whether said receiver is associated with a member that is no longer part of the conference.

13. A method of adding a joining member to an ongoing conference comprising:

sending an invitation over a packet switched network from an inviting member to joining member, the invitation specifying other conference members participating in said ongoing conference;

sending messages from said joining member to said participating conference members to request admission to the conference;

if permission is denied, allowing one or more conference members to override said denial; and overriding said denial by splitting from the conference any member issuing said denial.

14. The method of claim 13 wherein any member of the conference can perform said overriding step.

15. The method of claim 13 further comprising the step of overriding said denial by bridging the joining member into the conference through an overriding member.

* * * * *